United States Patent [19]

Parsons, III et al.

[11] 3,868,338

[45] Feb. 25, 1975

[54] THERMOSETTING POLYESTER POWDER COATING COMPOSITIONS

[75] Inventors: Theron E. Parsons, III; Francis J. Sheme, both of Kingsport, Tenn.

[73] Assignee: Eastman Kodak Company, Rochester, N.Y.

[22] Filed: Feb. 26, 1973

[21] Appl. No.: 335,871

[52] U.S. Cl............ 260/15, 117/161 C, 117/161 K, 117/161 LN, 117/132 A, 117/132 BF, 117/166, 260/16
[51] Int. Cl..................... C08b 21/08, C08g 37/32
[58] Field of Search....... 260/15; 117/161 C, 161 K, 117/161 LN, 166, 132 AB, 132 BF

[56] References Cited
UNITED STATES PATENTS

| | | | |
|---|---|---|---|
| 3,265,645 | 8/1966 | Coney et al............................ | 260/15 |
| 3,378,402 | 4/1968 | Wiener.................................. | 260/75 |
| 3,684,565 | 8/1972 | Psencik................................. | 260/850 |
| 3,714,090 | 1/1973 | Lasher................................... | 260/21 |
| 3,759,854 | 9/1973 | Chang et al............................ | 260/21 |

Primary Examiner—Morris Liebman
Assistant Examiner—Edward Woodberry
Attorney, Agent, or Firm—John F. Stevens; Daniel B. Reece, III

[57] ABSTRACT

Thermosetting powder coating compositions are prepared from a mixture of a polyester derived from a substantial amount of 2,2,4-trimethylpentane-1,3-diol as the glycol component and a major amount of isophthalic acid as the acid component, cellulose acetate butyrate, a crosslinking agent and a blocked catalyst. The polyester and cellulose ester are compatible in the mixture, and the powder does not cold flow at room temperature. A coating made from this composition has good physical properties.

7 Claims, No Drawings

THERMOSETTING POLYESTER POWDER COATING COMPOSITIONS

This invention relates generally to thermosetting powder coating compositions, and more specifically to such compositions comprising a compatible mixture of a polyester and a cellulose ester.

Plastic materials for powder coatings are classified broadly as either thermosetting or thermoplastic. In the use of thermoplastic powder coatings, heat is applied to the coating on the substrate, thereby melting the particles of thermoplastic powder. The molten particles flow together and form a smooth coating prior to removal of heat, which allows the coating to cool and solidify.

Thermoplastic coatings, however, have several diadvantages compared to thermosetting coatings. Thermosetting coatings generally are tougher, more resistant to solvents, have better adhesion to metal substrates, and do not tend to soften when exposed to elevated temperatures. On the other hand, thermosetting powder coatings have a disadvantage in that they tend to cure or set by the application of heat prior to the formation of a smooth coating, resulting in a relatively rough or cratered finish, thus lacking the gloss and luster characteristic of thermoplastic powder coatings which are often desirable. This has resulted in thermosetting coatings usually being applied in organic solvent systems, which is sometimes objectionable because of fire and health hazards as well as cost.

When cellulose acetate butyrate is included as a component in thermosetting powder coating compositions, the softening point of the powder composition is raised sufficiently so that it is friable enough to remain a powder at ambient temperatures. Such friability is essential in powder coatings to prevent caking of the composition prior to deposition on the substrate to be coated. A powder coating composition which cakes, forms lumps, or otherwise is not free-flowing, does not lend itself to the normal application techniques, such as by fluidized bed, electrostatic fluidized bed, flock gun, flame gun, or electrostatic powder gun deposition. Cellulose acetate butyrate, therefore, is a very desirable component in powder coating compositions, as it enhances the properties of the powder.

Polyesters are known to be useful in the formation of coatings, both in solution form and in powder form. Polyesters, generally speaking, form coatings of excellent physical properties such as adhesion to metal substrates, flexibility, impact resistance, weatherability, scuff resistance, etc. Difficulty has been encountered, however, in forming powder coating compositions containing both polyesters and cellulose esters due to the fact that they often lack compatibility. The present invention provides a powder coating composition of a particular polyester and cellulose ester which are compatible with each other in the system, and furthermore, the combination contributes significantly to the physical properties of the composition.

It is, therefore, an object of the present invention to provide a thermosetting powder coating composition comprising a compatible mixture of a cellulose ester and polyester.

It is a further object of this invention to provide a non-caking thermosetting powder coating which is friable and free-flowing at ambient conditions.

It is another object of this invention to provide a thermosetting powder coating composition which will flow out prior to curing or thermosetting to result in a smooth, glossy coating substantially free of surface imperfections.

Other objects of this invention will appear herein.

According to this invention, a powder coating composition is provided comprising from about 50% to about 90% of a polyester, from about 5% to about 45% of cellulose acetate butyrate, from about 2% to about 15% of a crosslinking agent and from about 0.1% to about 3% of a catalyst, all percentages being by weight based on the total weight of the composition. The powder has an average particle size from about 10 to about 300 microns, preferably from about 20 to about 50 microns. The crosslinking agent is inactive until a relatively high temperature (about 300° – 340° F.) has been reached in the curing process, i.e., until after the powder has had an opportunity to flow out at temperatures of about 260° – 290° F. prior to crosslinking. This is accomplished by selection of a crosslinking resin and a blocked catalyst as described hereinafter.

The polyester component of the composition according to the invention is derived from a glycol component, a polyol component, and an acid component. On a molar basis, the glycol is present in an amount from about 50 to 80 mol percent, and the polyol is present in an amount from about 50 to 20 percent. It is essential to this invention that at least about 80 mol percent of the glycol is 2,2,4-trimethylpentane-1,3-diol. Up to about 20 mol percent of the glycol may be other well-known glycols such as ethylene glycol, propylene glycol, neopentyl glycol, 1,4-butylene glycol, or cyclohexanedimethanol. The polyol component may contain from four to 16 carbon atoms, and must contain at least three primary hydroxyl groups, for example, three to eight hydroxyl groups. Examples of such polyols include trimethylolpropane, trimethylolethane, glycerol, pentaerythritol, and dipentaerythritol. The acid component includes from about 60 to about 90 mol percent of an aromatic dicarboxylic acid such as isophthalic or terephthalic acid, and from about 40 to about 10 mol percent of a modifying acid. It is essential that at least about 80 mol percent of the aromatic dicarboxylic acid be isophthalic. Suitable modifying acids include parat-ert-butylbenzoic acid, oxalic, malonic, succinic, glutaric, adipic, pimelic, suberic, azelaic and sebacic. Of these modifying acids, adipic acid is preferred.

The compounds referred to above are either commercially available or can be produced by conventional methods well known to those skilled in the art.

The polyester described above may be prepared by conventional condensation polymerization techniques. For example, the polyester may be prepared by reacting the components under esterification conditions. The polyester so synthesized has an acid number of 1–80, but preferably less than 10, and a molecular weight (b.p. elevation method) between 1,000 and 4,000 with a molecular weight of 2,800–3,200 being preferred. The hydroxyl number may range from 20–300 with about 84 being preferred.

The cellulose ester component of the composition according to this invention contains acetate and butyrate groups, the butyryl content being from about 30 to about 55 percent by weight of the cellulose ester, the acetyl content being from about 0.5 to about 15 percent by weight of the cellulose ester, a hydroxy content of from about 0.1 percent to about 5 percent by weight of the cellulose ester, and a viscosity of from about 0.1 to about 30 as determined by ASTM Procedure Designation D–817-64 (Formula A) and D–1343-56. A cellulose acetate butyrate having such properties is available commercially from Eastman Chemical Products, Inc., under the designation "EAB 551-0.2."

The crosslinking agents of this invention are well known in the art and many are commercially available. Suitable crosslinking agents include melamine-formaldehyde resins such as alkylated melamine-formaldehyde resins such as those sold under the trade names Plaskon 3382, Resimine 879 and Beckamine 1216–S. A preferred crosslinking agent is hexamethoxymethylmelamine resin, sold under the trade name Cymel 300, a product of American Cyanamid Company.

To insure that the powder will flow out and form a smooth coating prior to crosslinking, it is desirable to delay the action of the crosslinking agent until a temperature is reached which is appreciably higher than the flow-out temperature. This may be accomplished by use of an acid catalyst such as p-toluenesulfonic acid which can be temporarily deactivated or neutralized by reacting it with an epoxy, that is, a compound containing an oxirane group, i.e.,

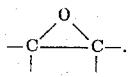

A suitable compound is

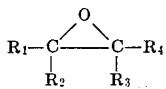

where $R_1$ is H, alkyl, aryl, or aryloxy from $C_1$ to $C_{20}$ and $R_2$, $R_3$, and $R_4$ are each hydrogen, alkyl from $C_1$ to $C_8$ or phenyl. Preferably, the compound is bisphenol A bisglycidyl ether or its low polymers commercially available from Shell Chemical Co. under the trade name Epon resins, and $R_2$, $R_3$ and $R_4$ are each hydrogen. Such a catalyst is described in a copending application of Parsons and Sheme filed of even date herewith.

The temporary deactivation of the acid catalyst is believed to occur through the oxirane group tying up the acid group which can later be freed or reactivated through the application of heat. To produce the temporarily deactivated catalyst, the acid catalyst and the epoxy compound are mixed with a slight stoichiometric excess of oxirane component and allowed to stand for a sufficient period of time to assure that a complete reaction has occurred. Once the reaction has occurred the catalyst is in a neutral state.

Another type of epoxy compound that is a good source of the oxirane group for use in forming the temporarily deactivated acidic catalyst is sold under the trade name Epoxol 9-5. Obviously, other materials or oils could be used as long as they will furnish an oxirane group for reacting with the acidic catalyst to form the desired reversible, normally neutral catalyst product. The blocking agent may also be any substituted oxirane such as ethylene oxide or propylene oxide.

Although p-toluenesulfonic acid is preferred as the base acid from which the blocked catalyst is to be formed, it should be realized that other such acids which will react properly with an oxirane group radical and can later be restored to an acidic or active condition by heating for promoting a reaction between the melamine could be used. Examples of other acids which can be used are: phenyl acid phosphate, butyl acid phosphate, oxalic acid, benzene sulfonic, and monobutyl acid maleate.

It is desirable to conduct the blocking of the catalyst in a mixture containing an inert ingredient such as an alcohol, e.g., n-butanol, as a solvent in order to limit the rate of the blocking reaction. If the reaction is too vigorous, a great deal of heat is evolved and, in the absence of solvent, the temperature may reach a point when the oxirane component will either evaporate from the reaction vessel or will polymerize into a gel.

The blocked catalyst does not unblock at temperatures below about 300° C. with any appreciable rate. On the other hand, temperatures above 325° C. do not appear to be necessary to cause the hydroxy containing polymers to react with the amino resins present once the catalyst becomes unblocked.

It is believed that an acid, HB, reacts with a compound containing an oxirane structure to form a beta hydroxy ester of the acid. That is, the following reaction occurs which results in the formation of the blocked catalyst:

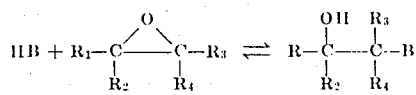

$R_1$, $R_2$, $R_3$, $R_4$ are as defined hereinbefore. B represents the anion of the acid used for catalysis.

In the specific case of p-toluenesulfonic acid and propylene oxide the reaction is believed to be:

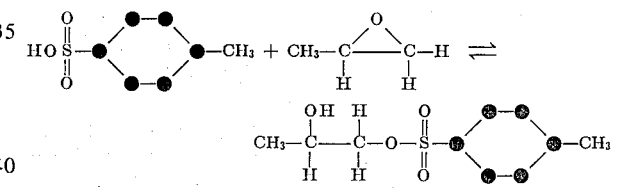

When heated above about 300° F., this reaction is apparently reversed, allowing the free acid to be formed which thus is available to catalyze the crosslinking of the film. It is apparently only at temperatures above about 300° F. that this reverse action occurs rapidly enough to cause the crosslinking reaction to take place rapidly.

According to a further aspect of our invention there is provided a composition as described above which may include up to about 20 parts by weight, based on the total weight of the composition, of a plasticizing ester of an organic acid and an alcohol having plasticizing properties in conjunction with said cellulose ester and the polyester. Such a plasticizer should, of course, be compatible with the components of the composition. Illustrative of suitable plasticizers are, for example, di-2-ethylhexyl phthalate prepared by reacting phthalic acid with di-2-ethylhexyl alcohol, di(2-ethylhexyl) isophthalate, di(2-ethylhexyl) azelate, didecyl phthalate, dibutyl phthalate, triphenyl phosphate, tricresyl phthalate, dibutyl sebacate, dioctyl adipate, and butylbenzyl phthalate.

According to still another aspect of this invention, the composition may include up to about 50 percent by weight of a pigment, a dye or a combination thereof, to give the composition any desired color and hiding or covering power.

According to a further aspect of this invention, the composition may include about 1 percent by weight, based on the weight of the polyester component, of a polyester stabilizer which functions to prevent degradation of the polyester and thereby prevent darkening or other adverse color change of the composition as a whole. The stabilizer compound dilauryl-3,3'-thiodipropionate may be used effectively. The employment of the stabilizer thus provides a means of obtaining color uniformity in coatings produced from our novel compositions under widely varying fusion tempertures.

Powdered compositions prepared as described above may be employed in accordance with our invention to produce fused coatings on the surfaces of any heatable substrate. Examples of such heatable substrates are those composed of steel, copper, aluminum and other metals, glass, ceramics, thermosetting resins such as phenolics, urea-formaldehyde and urea-melamine resins, thermosetting plastics such as thermosetting polyesters and crystalline linear polyesters such as polyethylene terephthalate, and the like.

The following examples are submitted for a better understanding of the invention.

EXAMPLE 1

A polyester is synthesized using well-established procedures. The polymer has an acid number of less than 10 and a molecular weight (b.p. elevation method) between 2,800 and 3,200. This resin is composed of the following compounds in the ratios shown:

| Reactants | Equivalents | Approximate Mol Percent |
|---|---|---|
| 2,2,4-trimethylpentane-1,3-diol | 9.21 | 78 |
| Trimethylolethane | 3.74 | 22 |
| Isophthalic Acid | 9.36 | 88 |
| Adipic Acid | 1.33 | 12 |

| Physical Constants | Equivalents | Approximate Mol Percent |
|---|---|---|
| Hydroxyl Number Calculated | 84 | |
| Softening Point Range, °C. | 95–100 | |
| Viscosity at 350°F., cps | 3945 | |

The resulting resin is powderable at room temperature and does not cold flow.

EXAMPLE 2

A polyester is synthesized using a monofunctional

| Reactants | Equivalents | Approximate Mol Percent |
|---|---|---|
| 2,2,4-trimethylpentane-1,3-diol | 7.13 | 66 |
| Trimethylolpropane | 5.58 | 34 |
| Isophthalic Acid | 9.85 | 89 |
| para-tert-Butylbenzoic Acid | 0.61 | 11 |

| Physical Constants | | |
|---|---|---|
| Hydroxyl Number, Calculated | 84 | |
| Softening Point Range, °C. | 91–95 | |
| Viscosity at 350°F., cps | 2425 | | acid in place of adipic acid as in Example 1. This resin is prepared by standard laboratory procedures with an acid number of 12 and a molecular weight (b.p. elevation method) 2,600 and 2,800.

The resulting resin is powderable at room temperature and does not cake at ambient conditions.

EXAMPLE 3

A polyester resin is made by standard laboratory procedures using isophthalic acid as the only dibasic acid. The polymer has an acid number of 22 and a calculated molecular weight of 3,000.

| Reactants | Equivalents | Approximate Mol Percent |
|---|---|---|
| 2,2,4-trimethylpentane-1,3-diol | 9.02 | 79 |
| Trimethylolpropane | 3.73 | 21 |
| Isophthalic Acid | 10.40 | 100 |

| Physical Constants | Equivalents | Approximate Mol Percent |
|---|---|---|
| Hydroxyl Number, Calculated | 84 | |
| Equivalent Weight Calculated | 670 | |

The resulting resin is powderable at room temperature and does not cold flow. Tests in Example V indicate that this polyester is not as compatible with cellulose acetate butyrate as those polyesters containing a small amount of a second acid.

EXAMPLE 4

A polyester as prepared in Example 1 is modified by incorporating a small amount of a polyester derived from neopentyl glycol, terephthalic acid and isophthalic acid, (I.V. = 0.60) a high molecular weight thermoplastic, into the polymer. The modifying polyester is added at the beginning of the reaction. The resulting polymer has an acid number of 33 and a molecular

| Reactants | Equivalents | Approximate Mol Percent | Parts |
|---|---|---|---|
| 2,2,4-trimethylpentane-1,3-diol | 9.21 | 78 | |
| Trimethylolethane | 3.74 | 22 | 90 |
| Isophthalic Acid | 9.36 | 88 | |
| Adipic Acid | 1.33 | 12 | |
| Modifying polyester | — | | 10 |
| | | | 100 | weight (b.p. elevation method) between 2,200 and 2,400.

The resulting resin is powderable at room temperature and does not cold flow at ambient conditions.

EXAMPLE 5

The compatibility of cellulose acetate butyrate with the polyester resins of Examples 1, 2, 3 and 4 is determined by the following procedure:

Samples of the solid resin are dissolved in methylene chloride and 25% by weight cellulose acetate butyrate (EAB–551-0.2) is added to the solution. Thin films (20 mil wet) are cast from these solutions onto glass plates and compatibility is determined visually by the amount of haze present in the film. The compatibility is rated on a scale of 1–10 (10 = Best) as is the established laboratory procedure for determining compatibility. Results are as follows:

| Resins from: | Parts | | | |
|---|---|---|---|---|
| | A | B | C | D |
| Example 1 | 75 | — | — | — |
| Example 2 | — | 75 | — | — |
| Example 3 | — | — | 75 | — |
| Example 4 | — | — | — | 75 |
| | Parts by Weight | | | |
| Mix With: EAB-551-0.2 | 25 | 25 | 25 | 25 |
| Compatibility | 10 | 10 | 5 | 10 |
| Scale: 10 = Best (No Haze); 1 = Poorest | | | | |

EXAMPLE 6a

A powdered enamel is prepared by blending the individual components in one of several ways. In order to produce a spray dried powder pigmented with titanium dioxide, the following procedure is followed.

a. The $TiO_2$ is dispersed in cellulose acetate butyrate on a heated two-roll mill at the following ratio: 60 parts pigment/40 cellulose acetate butyrate. Cellulose acetate butyrate (EAB-551-0.2 is used with the thermosetting polyester of Example 1 described above.

b. A blocked catalyst solution is prepared by dissolving 1 part p-toluenesulfonic acid in 1 part n-butanol and slowly adding 8 parts Epon 812 with stirring. External cooling is required in large batch preparations.

c. A solution consisting of the following is prepared:

| | | |
|---|---|---|
| Pigment Chip 60/40 TiO₂/EAB-551-0.2 | 150.00 | g. |
| Thermosetting Polyester (See Ex. 1) | 218.10 | g. |
| Hexamethoxymethylmelamine | 21.75 | g. |
| Modaflow | 3.00 | g. |
| Blocked Catalyst Mixture | 3.00 | g. |
| Methylene Chloride | 1700.00 | g. |

The mixture is spray dried by means of a Bowen spray drier using an 11 mil airless spray nozzle. The chamber of the spray drier is maintained at 150° F. and the feed ratio of the solution is adjusted so that the exit temperature of the powder does not exceed 100° F. The finished powder is weighed and 0.1% of fumed silica such as Aerosil R-972 or Silanox 101 are added to improve the powder fluidity. The silica is homogeneously dispersed into the powder by tumbling the mixture for 20-30 minutes. The finished product is stored in moisture proof containers along with a permeable bag of a moisture absorber such as anhydrous calcium sulfate or anhydrous silica gel.

The powdered enamel does not cold flow and is suitable for application by electrostatic spray to substrates which are electrically conductive or which have been made electrically conductive by applying a conductive primer. Such substrates must also be capable of being heated to 325° F. without degradation.

Electrostatic potentials of 30, 45, 60, 70, 85 and 120 kilovolts are used to apply the powdered enamels to steel substrates. The powder coated objects are then placed in a 280° F. oven for a period of 15 minutes during which the powder softens and flows out to form a smooth film. The blocked catalyst remains blocked at this temperature for this period of time allowing little or no crosslinking to occur. The coated substrate is then placed in a 325° F. oven for 10-15 minutes during which time the catalyst unblocks and the curing mechanism is activated. The cured film is glossy, tough, durable and has a high degree of solvent resistance — in short, the film has the properties associated with conventional solvent-based heat curing enamels.

EXAMPLE 6 b

Example 6 a is repeated, using the polyesters of Examples 2 and 4. Similar results, in terms of powder properties (compatibility friability, etc.) and coating properties (gloss, impact resistance, etc.) are obtained to the results of Example 6 a.

EXAMPLE 7

A powder coating enamel of the same composition as Example 6 is prepared without the use of methylene chloride or predispersed pigment chip. The powdered enamel is prepared by mixing all ingredients together and compounding them in a Banbury mixer. The material is fluxed at 220° – 280° F. for 20-30 minutes. This gives an enamel which contains dispersed pigment, crosslinking agent (hexamethoxymethylmelamine) blocked catalyst, 2,2,4-trimethylpentane-1,3-diol based polyester resin, cellulose acetate butyrate and Modaflow. This enamel is cryogenically ground on a hammermill to a particle size suitable for electrostatic spray application or for fluidized bed application. The classified powder which does not cold flow is electrostatically applied to suitable substrate (steel, aluminum or reinforced plastic composites) can be cured with heat to give a durable, solvent resistant protective coating.

EXAMPLE 8

A metallic powder coating enamel can be prepared by spray drying according to the following procedure:

a. A pigment grind consisting of 40 parts phthalocyanine blue and 60 parts EAB-551-0.2 is prepared as per Example 6.

b. The following formula is mixed for spray drying:

| | | |
|---|---|---|
| CAB/Phthalo blue pigment chip 60/40 | 7.50 | g. |
| Thermosetting polyester (Example 1) | 218.10 | g. |
| Hexamethoxymethylmelamine | 21.78 | g. |
| EAB-551-0.2 | 55.50 | g. |
| Modaflow | 3.00 | g. |
| Blocked Catalyst (Example 6) | 3.00 | g. |
| Methylene Chloride | 1700.00 | g. |
| Aluminum tinting paste (65%) | 4.50 | g. |

This mixture is spray dried, does not cold flow, is compatible and may be applied as outlined in Examples 6.

EXAMPLE 9

A polyester is synthesized using well-established procedures. The polymer has an acid number of 4.0, and a molecular weight of 3,000. The resin is composed of the following compounds in the ratios shown:

| Reactants | Equivalents | Approximate Mol Percent |
|---|---|---|
| 1,4-butanediol | 11.13 | 82 |
| Trimethylolpropane | 3.65 | 18 |
| Isophthalic acid | 12.57 | 100 |
| Physical Constants | | |
| Hydroxyl Number, Calculated | 84 | |
| Softening Point Range, °C. | 95–98 | |
| Viscosity at 350°F., cps | 14,225 | |

The resulting resins, when blended with cellulose acetate butyrate, crosslinking agent, and catalyst is found to cold flow at room temperature and is not compatible with cellulose acetate butyrate.

The powdered composition may be deposited on the substrate by use of a powder gun, by electrostatic deposition or by deposition from a fluidized bed or by other well-known methods of powder deposition. After deposition the powder is heated to a temperature sufficient to cause its particles to flow and thus fuse together to form a smooth, uniform, continuous, uncratered, adhesive coating on the substrate surface.

The powder coating composition of this invention may be dissolved in a solvent such as methylene chloride and spray dried to arrive at the desired fine particle condition, by procedures well known to those skilled in the art. Alternately, the components may be homogenized on a two roll hot mill, from which the homogenized material emerges in sheet form, is solidified by cooling, and cut into cubical pellets of approximately ⅛-inch size. These pellets are then pulverized in a grinder to a powder having an average particle size ranging from about 10 to about 200 microns.

Although the invention has been described in considerable detail with particular reference to certain preferred embodiments thereof, variations and modifications can be effected within the spirit and scope of the invention.

We claim:

1. A thermosetting coating composition in the form of a powder having an average particle size range of from about 10 to about 300 microns comprising
    a. from about 50% to about 90% by weight of a polyester derived from a dicarboxylic acid component, at least 50 mol percent of which is isophthalic acid, a glycol component, at least 50 mol percent of which is 2,2,4-trimethylpentane-1,3-diol and from about 3 to about 10 mol percent of a polyol containing from two to 16 carbon atoms and having at least three primary hydroxyl groups,
    b. from about 5% to about 45% by weight of cellulose acetate butyrate having a butyryl content of from about 30 to about 55% by weight, a hydroxyl content of from about 0.1 to about 5%, an acetyl content of from about 0.5 to about 15% by weight and a viscosity of between about 0.1 and 30 seconds,
    c. from about 2% to about 15% by weight to a melamine crosslinking agent, and
    d. from about 0.1% to about 3% by weight of the reaction product of an acid and a compound containing oxirane groups,
    said powder being free of appreciable crosslinking.

2. A thermosetting coating composition according to claim 1 wherein the powder has an average particle size of from about 20 to about 50 microns.

3. A thermosetting coating composition according to claim 1 wherein said polyester is derived from (a) from about 50 to about 80 mol percent of a glycol of which at least about 80 percent is 2,2,4-trimethylpentane-1,3-diol, (b) from about 50 to about 20 mol percent of a polyol having from four to 16 carbon atoms and at least three primary hydroxyl groups, and (c) from about 60 to about 90 mol percent of an aromatic dicarboxylic acid of which at least 80 percent is isophthalic acid.

4. The thermosetting coating composition according to claim 1 wherein said crosslinking agent is hexaalkoxymethylmelamine wherein the alkoxy group contains one and 20 carbon atoms.

5. A thermosetting coating composition according to claim 4 wherein the alkoxy group contains between one and eight carbon atoms.

6. A thermosetting coating composition according to claim 1 wherein said reaction product is the reaction product of an aromatic sulfonic acid and a compound containing at least one oxirane group.

7. A thermosetting coating composition in the form of a powder having an average particle size range of from about 10 to about 300 microns comprising
    a. a polyester derived from (1) from about 50 to about 80 mol percent of a glycol of which at least about 80 percent is 2,2,4-trimethylpentane-1,3-diol, (2) from about 50 to about 20 mol percent of a polyol having from four to 16 carbon atoms and at least three primary hydroxyl groups, and (3) from about 60 to about 90 mol percent of an aromatic dicarboxylic acid of which at least 80 percent is isophthalic acid,
    b. from about 5% to about 45% by weight of cellulose acetate butyrate having a butyryl content of from about 30 to about 55% by weight, a hydroxyl content of from about 0.1 to about 5%, an acetyl content of from about 0.5 to about 15% by weight and a viscosity of between about 0.1 and 30 seconds.
    c. from about 2% to about 15% by weight of a hexaalkoxymethylmelamine wherein the alkoxy group contains from 1 to 20 carbon atoms, and
    d. from about 0.1% to about 3% by weight of the reaction product of an aromatic sulfonic acid and a compound containing at least one oxirane group,
    said powder being free of appreciable crosslinking.

* * * * *

PO-1050
(5/69)

UNITED STATES PATENT OFFICE
CERTIFICATE OF CORRECTION

Patent No. __3,868,338__ Dated __February 25, 1975__

Inventor(s) __Theron E. Parsons III and Francis J. Sheme__

It is certified that error appears in the above-identified patent and that said Letters Patent are hereby corrected as shown below:

Column 10, line 18, before the word "one" insert ---between---.

Signed and sealed this 29th day of April 1975.

(SEAL)
Attest:

RUTH C. MASON
Attesting Officer

C. MARSHALL DANN
Commissioner of Patents
and Trademarks